(12) United States Patent
Fromentin

(10) Patent No.: US 11,124,599 B2
(45) Date of Patent: Sep. 21, 2021

(54) NEAR INFRARED LIGHT-CUTTING OPTICAL ARTICLES WITH LOW RESIDUAL COLOR

(71) Applicant: ESSILOR INTERNATIONAL, Charenton-le-Pont (FR)

(72) Inventor: Pierre Fromentin, Bangkok (TH)

(73) Assignee: Essilor International, Charenton-le-Pont (FR)

( * ) Notice: Subject to any disclaimer, the term of this patent is extended or adjusted under 35 U.S.C. 154(b) by 45 days.

(21) Appl. No.: 16/347,347

(22) PCT Filed: Oct. 20, 2017

(86) PCT No.: PCT/EP2017/076915
§ 371 (c)(1),
(2) Date: May 3, 2019

(87) PCT Pub. No.: WO2018/082946
PCT Pub. Date: May 11, 2018

(65) Prior Publication Data
US 2020/0262967 A1 Aug. 20, 2020

(30) Foreign Application Priority Data
Nov. 4, 2016 (EP) .................................. 16306443

(51) Int. Cl.
| | | |
|---|---|---|
| C08G 18/75 | (2006.01) | |
| B29D 11/00 | (2006.01) | |
| C08G 18/08 | (2006.01) | |
| C08G 18/24 | (2006.01) | |
| C08G 18/28 | (2006.01) | |
| C08K 5/3417 | (2006.01) | |
| C08K 5/3437 | (2006.01) | |
| G02B 1/04 | (2006.01) | |
| G02C 7/10 | (2006.01) | |
| B29K 75/00 | (2006.01) | |
| B29K 105/00 | (2006.01) | |

(52) U.S. Cl.
CPC ...... *C08G 18/758* (2013.01); *B29D 11/00634* (2013.01); *C08G 18/14* (2013.01); *C08G 18/242* (2013.01); *C08G 18/288* (2013.01); *C08K 5/3417* (2013.01); *C08K 5/3437* (2013.01); *G02B 1/04* (2013.01); *G02B 1/041* (2013.01); *G02C 7/104* (2013.01); *B29K 2075/00* (2013.01); *B29K 2105/0002* (2013.01); *B29K 2995/003* (2013.01); *C08K 2201/014* (2013.01)

(58) Field of Classification Search
CPC .. C08G 18/758; C08G 18/288; C08G 18/242; C08G 18/14; C08K 5/3437; C08K 5/3417; C08K 2201/014; B29D 11/00634; B29K 2075/00; B29K 2995/003; B29K 2105/0002; G02B 1/041; G02B 1/04; G02C 7/104
See application file for complete search history.

(56) References Cited

U.S. PATENT DOCUMENTS

| | | | |
|---|---|---|---|
| 4,528,311 A | 7/1985 | Beard et al. | |
| 5,236,633 A | 8/1993 | Satake et al. | |
| 5,880,176 A * | 3/1999 | Kamoto | C09D 11/50 523/172 |
| 2014/0252282 A1 | 9/2014 | Erkelenz et al. | |

FOREIGN PATENT DOCUMENTS

| | | |
|---|---|---|
| CN | 101866063 | 10/2010 |
| EP | 0989417 | 3/2000 |
| EP | 2138887 | 12/2009 |
| JP | H10-221523 | 8/1998 |
| JP | 2003-107412 | * 4/2003 |
| WO | WO 2017/001410 | 1/1917 |
| WO | WO 2017/191254 | 11/1917 |
| WO | WO 2006/121607 | 11/2006 |
| WO | WO 2007/018065 | 2/2009 |
| WO | WO 2010/050297 | 5/2010 |
| WO | WO 2012/080397 | 6/2012 |

OTHER PUBLICATIONS

Machine English translation of JP 2003-107412, Matsushita et al., Apr. 2003.*
Fabian, et al., "Near Infrared-Absorbing Dyes," *Chemical Reviews*, 1197-1226, 1992.
International Search Report and Written Opinion issued in International Patent Application No. PCT/EP2017/076915, dated Jan. 4, 2019.

* cited by examiner

*Primary Examiner* — Patrick D Niland
(74) *Attorney, Agent, or Firm* — Norton Rose Fulbright US LLP

(57) ABSTRACT

The present invention relates to an optical article having a substrate made of an optical material comprising a polymer matrix and at least one near infrared absorber, wherein $T_{VIS}$ is higher than or equal to 70%, $T_{NIR}$ is lower than or equal to 85%, $T_{NIR}$ and $T_{VIS}$ being respectively the average optical transmittance in the 780-1400 nm and in the 380-780 nm wavelength range for the optical material through a 2 mm thick layer of said optical material. This optical article can be used to protect from noxious infrared light.

16 Claims, 1 Drawing Sheet

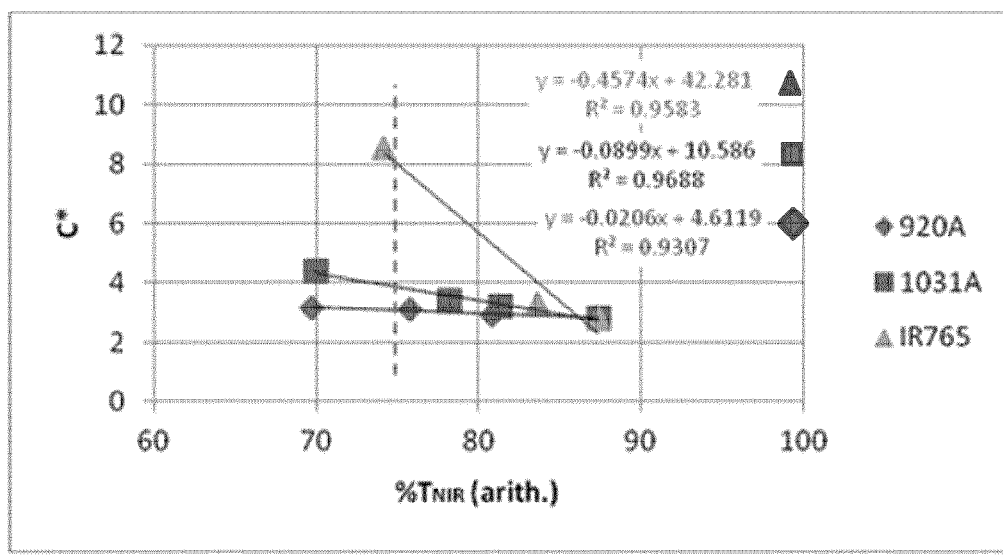

NEAR INFRARED LIGHT-CUTTING OPTICAL ARTICLES WITH LOW RESIDUAL COLOR

CROSS-REFERENCE TO RELATED APPLICATIONS

This application is a national phase application under 35 U.S.C. § 371 of International Application No. PCT/EP2017/076915 filed 20 Oct. 2017, which claims priority to European Patent Application No. 16306443.9 filed 4 Nov. 2016. The entire contents of each of the above-referenced disclosures is specifically incorporated by reference herein without disclaimer.

FIELD OF THE DISCLOSURE

The present invention relates to optical materials comprising compounds that absorb near infrared light, and more particularly to ophthalmic lenses containing these materials. The present invention is also directed to methods of making these materials.

DESCRIPTION OF RELATED ART

Throughout life, the eye is exposed to daily fluxes of solar radiation. Solar radiation is filtered by the Earth's atmosphere so that at sea level about 80% of the solar energy is restricted to a narrow spectral band from about 300 nm in the ultraviolet region to 1100 nm in the infrared region. Longer wavelengths are primarily filtered out by atmospheric water vapor, whereas shorter wavelengths are absorbed by the ozone layer. Furthermore, certain spectral components of solar light incident on the cornea are partially filtered out before reaching the human retina. Both the cornea and the human lens absorb part of the infrared radiation—mainly the water bands at 980 nm, 1200 nm, and 1430 nm. The vitreous absorbs light above 1400 nm, up to 10 µm.

Thus, the non-ionizing radiation reaching the retina is the so-called 'visible component' of the electromagnetic spectrum (380-780 nm), and some of the UV light and near infrared light.

Infrared (IR) radiation lies beyond the visible spectrum with wavelength range from 780 nm to 1 mm. It can be divided into three sub-regions, including the IR-A range, or near infrared (NIR) range, which covers the wavelength range from 780 to 1400 nm.

Extensive studies have been done to evaluate the effect of NIR wavelengths in the eyes. NIR rays can transmit through the ocular media (i.e. cornea, lens, aqueous, iris) to the retina and are absorbed by retinal pigment epithelium. It can cause structural retinal damage via at least one of three fundamental processes: photomechanical (or photoacoustic), photothermal (heating effects) and photochemical, depending on its fluence rate, total dose and spectral characteristics.

Acute NIR exposure is well known to lead to cataract, and recent investigations showed strong presumption that cataract can also be triggered upon chronic NIR exposure. Some studies also indicate that by absorbing heat, NIR absorbing lenses may reduce proteins denaturation in the human lens, which seems to be linked with early presbyopia in hot countries. Heat absorbing lenses that cut NIR also increase wearers comfort by diminishing eye's dryness.

Thus, it is recommended to limit exposure of the eyes to harmful NIR light. Eyeglasses are particularly suitable to offer protection against such potentially harmful light by decreasing the amount of NIR rays reaching the eyes. It has already been suggested to cut at least partially NIR light by means of a filter inhibiting the light in a suitable wavelength range, through absorption or through reflection.

Optical filtering means are frequently incorporated in optical articles in order to reduce or prevent NIR light from reaching the retina (in particular in ophthalmic lens materials). They include absorbing filters comprising NIR absorbers and interferential filters such as reflective filters. However, designing specific coatings, such as antireflective coatings, to additionally selectively reflect NIR may be at the cost of other features of the coating. Optimizing the reflection performances over the NIR region reveals generally detrimental to the antireflective performances in the visible region, and vice versa.

The NIR absorber can be incorporated into the finished product through different technologies at different locations, in a coating or in the bulk substrate, for example by impregnation of the substrate or by incorporation in a substrate precursor formulation.

Introducing these materials in coatings is less preferred, since it requires additional processing steps, and depending on molar extinction, high concentrations may be necessary, thus degrading the mechanical properties of the coating. The introduction of near infrared absorbers in substrates is thus highly desirable.

Most near infrared absorbers also absorb in the visible range, imparting color to the lens and chromaticity increase. This is detrimental to the color perception of the wearer, in terms of cosmetic aspects, and resulting lenses may not be accepted by wearers, especially when considering non solar products. Typically, color balancing dyes may be added to neutralize the color brought by the near infrared absorbing compounds, but the final lens appears grayish, and transmission in the visible range is reduced, reducing wearer's comfort.

Several patent applications disclose laser or welding protection windows or goggles, but all these shields show a strong residual color. For example, the application US 2014/0252282 discloses polymer compositions for the production of moldings, in particular spectacles and eye-protection equipment that are specifically targeted to protect eyes from welding arcs. The polymer compositions include a mixture of organic/inorganic NIR absorbers in a thermoplastic matrix.

The following references can also be cited: EP 2138887, U.S. Pat. No. 5,236,633, WO 2006/121607 and WO 2012/080397.

SUMMARY OF THE INVENTION

In view of the foregoing issues, there is a need for an optical material comprising a means capable of at least partially blocking transmission of the noxious near infrared wavelength range that is compatible with the other components of the optical material composition, without impairing the polymerization of the optical material composition and mechanical properties of final optical material, that does neither generate additional color nor impair transmission in the visible range. It is also desirable that the optical material exhibits a low level of yellowness, no cosmetic defects, and protection from harmful UV and/or blue light.

The optical material should be perceived as transparent and mostly colorless by an external observer.

The process for manufacturing such an article should be simple, easy to implement and reproducible. Another objective is to enhance productivity by shortening the preparation time of the optical material.

To address the needs of the present invention and to remedy to the mentioned drawbacks of the prior art, the applicant provides an optical article having a substrate made of an optical material comprising a polymer matrix and at least one near infrared absorber, the optical material having the following properties: $T_{VIS}$ is higher than or equal to 70%, and $T_{NIR}$ is lower than or equal to 85%, $T_{NIR}$ being the average optical transmittance in the 780-1400 nm wavelength range for the optical material containing said at least one near infrared absorber through a 2 mm thick layer of said optical material, and $T_{VIS}$ being the average optical transmittance in the 380-780 nm wavelength range for the optical material containing said at least one near infrared absorber through a 2 mm thick layer of said optical material.

The invention provides a substrate-borne near infrared filter in a simple way and at competitive cost by using NIR absorbers in order to at least partially cut the infrared wavelengths that may present an impact on health. These NIR absorbers have minimum or no absorption in the visible range, and can be easily incorporated in polymerizable compositions in a very short processing time. The polymerizable compositions containing the NIR-absorbers of the invention have good processability characteristics such as machinability, and are suitable as optical plastics.

BRIEF DESCRIPTION OF THE DRAWINGS

The foregoing and other objects, features and advantages of the present invention will become readily apparent to those skilled in the art from a reading of the detailed description hereafter when considered in conjunction with the accompanying drawing.

FIG. 1: represents the plotting of the chroma as a function of the average transmission in the near infrared region for two optical materials according to the invention and one comparative optical material.

DETAILED DESCRIPTION OF THE INVENTION

The optical material according to the invention is preferably used as the substrate of an optical article. It is generally comprised in a transparent optical article, in particular an optical lens or lens blank, more preferably an ophthalmic lens or lens blank.

In the present description, unless otherwise specified, an optical article/material is understood to be transparent when the observation of an image through said optical article is perceived with no significant loss of contrast, that is, when the formation of an image through said optical article is obtained without adversely affecting the quality of the image. This definition of the term "transparent" can be applied to all objects qualified as such in the description, unless otherwise specified.

The term "ophthalmic lens" is used to mean a lens adapted to a spectacle frame to protect the eye and/or correct the sight. Said lens can be chosen from afocal, unifocal, bifocal, trifocal and progressive lenses. Although ophthalmic optics is a preferred field of the invention, it will be understood that this invention can be applied to optical articles of other types where filtering NIR wavelengths may be beneficial, such as, for example, lenses for optical instruments, in photography or astronomy, optical sighting lenses, ocular visors, optics of lighting systems, etc.

The optical lens may be coated on its front main surface, rear main side, or both sides with one or more functional coatings. As used herein, the rear face of the substrate is intended to mean the face which, when using the article, is the nearest from the wearer's eye. It is generally a concave face. On the contrary, the front face of the substrate is the face which, when using the article, is the most distant from the wearer's eye. It is generally a convex face. The optical lens can also be a plano lens.

A substrate, in the sense of the present invention, should be understood to mean an uncoated substrate, and generally has two main faces. The substrate may in particular be an optically transparent material having the shape of an optical article, for example an ophthalmic lens destined to be mounted in glasses. In this context, the term "substrate" is understood to mean the base constituent material of the optical lens and more particularly of the ophthalmic lens. This material acts as support for a stack of one or more coatings or layers.

The substrate of the optical article of the invention is an organic glass substrate, for instance an organic glass made from a thermoplastic or thermosetting plastic, generally chosen from transparent materials of ophthalmic grade used in the ophthalmic industry.

The NIR absorbers of the present invention can be incorporated into any thermoplastic and thermoset resins, preferably thermoset resins.

Thermoplastic material may be selected from, for instance polyamides, polyimide, polysulfones, polycarbonates, polyurethanes, poly(ethylene terephthalate), polymethylmethacrylate (PMMA) and copolymers thereof. Preferred thermoplastic materials are polycarbonates.

The preferred class of substrate materials comprises thermoset resins which may be selected from, for instance: (meth)acrylic or thio(meth)acrylic polymers and copolymers or polyethoxylated aromatic (meth)acrylates, urethane and thiourethane polymers and copolymers, epoxy polymers and copolymers, episulfide polymers and copolymers, resins resulting from polymerization or (co)polymerization of alkylene glycol bis allyl carbonates such as polymers and copolymers of diethylene glycol bis(allylcarbonate) (marketed, for instance, under the trade name CR-39® by the PPG Industries company, the corresponding marketed lenses being referred to as ORMA® lenses from ESSILOR). The preferred thermoset substrates are made of resins resulting from polymerization or (co)polymerization of alkylene glycol bis allyl carbonates such as polymers and copolymers of diethylene glycol bis(allylcarbonate), polyurethane, polythiourethane resins, preferably polythiourethane resins, such as those having a refractive index of 1.60 or 1.67, or polyepisulfide resins, such as those having a refractive index of 1.74.

Specific examples of substrates suitable to the present invention are those obtained from thermosetting polythiourethane resins, which are marketed by the Mitsui Toatsu Chemicals company as MR® series, in particular MR6®, MR7® and MR8® resins. These substrates as well as the monomers used for their preparation are especially described in the U.S. Pat. Nos. 4,689,387, 4,775,733, 5,059,673, 5,087,758 and 5,191,055.

There are no particular restrictions on the method used to manufacture the optical article which includes a substrate made of an optical material according to the invention.

The polymer matrix of the present optical article can be obtained from methods that are well known to those of ordinary skill in the art, typically from an optical material composition ("substrate composition") comprising polymerizable compounds such as monomers, oligomers and/or prepolymers. The preferred polymerizable compounds are allyl glycol carbonates, polythiols, episulfides, polyisocyanates, polyisothiocyanates and (meth)acrylates. The preferred combinations of polymerizable compounds are a combination of diethylene glycol bis(allylcarbonate) and eventually oligomers of diethylene glycol bis(allylcarbonate), a combination of a polyisocyanate compound and a polyol compound, a combination of a polyisocyanate compound and a polythiol compound, and a combination of a polyepisulfide compound and a polythiol compound. Examples of useful polymerizable compounds are disclosed e.g. in WO 2014/133111.

The NIR absorbing compounds of the present invention can be incorporated into the mass of the substrate by methods well known in the art, preferably during the manufacture of the substrate itself, for example by casting polymerization or injection molding.

This is preferably carried out by mixing the compound in the optical material composition (an optical material resin or a polymerizable composition) and then forming a thermoplastic or thermosetting substrate matrix by curing the (liquid) composition in an appropriate mold.

More specifically, the optical material composition is poured into the cavity of a mold held together using a gasket or tape. Depending on the desired characteristics of the resulting optical material, degassing can be performed under reduced pressure and/or filtration can be performed under increased pressure or reduced pressure before pouring the optical material composition in the mold. After pouring the composition, the lens casting mold can be heated in an oven or a heating device immersed in water according to a predetermined temperature program to cure the resin in the mold. The resin molded product may be annealed if necessary.

Other methods can also be employed, in particular when the NIR absorbing compound is not sufficiently resistant to the high temperatures involved during casting or injection molding. Such methods include impregnation or imbibition methods consisting in dipping the substrate in an organic solvent and/or water-based hot bath in which the absorber has been dispersed (which then diffuses in the body of the substrate), the diffusion methods described in JP 2000-314088 and JP 2000-241601, involving an impregnatable temporary coating, or contactless coloration using a sublimable material, such as described in U.S. Pat. Nos. 6,534,443 and 6,554,873.

However, incorporating the NIR absorber in the polymerizable composition remains the preferred technique, as it does not require extra-processing steps to create the NIR-cutting function contrary to tinting methods, and because some NIR absorbers having polar and/or bulky groups could diffuse in substrate with difficulty.

Although additional near infrared absorbers can be present in coatings deposited at the surface of the substrate, this is preferably avoided, as including the NIR absorber in the substrate does not require additional processing steps to obtain the near infrared protection function, contrary to specific coating application. Further, NIR dyes are more photostable in substrates than in coatings, because substrates generally contain UV absorbers, and incorporating NIR absorbers in a coating may be detrimental to the final coating performances especially when a significant amount of those additives is employed, which may lead to a decrease of coating hardness, rigidity, optical clarity, etc., resulting in the necessity to make a compromise with the other properties of the coating.

The near infrared absorbers according to the invention are such that the resulting optical material has a $T_{VIS}$ higher than or equal to 70% and a $T_{NIR}$ lower than or equal to 85%, which means that they provide optical articles having a high decrease of transmission in the near infrared range upon incorporation of said near infrared absorbers in the substrate of the optical article. Preferably the resulting optical material has a $T_{VIS}$ higher than or equal to 75%, 76, 77, 78, 79 or 80%. Preferably, the resulting optical material has a $T_{NIR}$ lower than or equal to 80%, more preferably lower than or equal to 75%, even more preferably lower than or equal to 70%. Still more preferably, the optical material has a $T_{NIR}$ lower than or equal to 60%. Even more preferably, the optical material has a $T_{NIR}$ lower than or equal to 50%.

Preferably, the resulting optical material has a $T_{VIS}$ higher than or equal to $0.95 \times T_{NIR}$. More preferably, the optical material has a $T_{VIS}$ higher than or equal to $0.97 \times T_{NIR}$. Even more preferably, the optical material has a $T_{VIS}$ higher than or equal to $0.98 \times T_{NIR}$. Still more preferably, the optical material has a $T_{VIS}$ higher than or equal to $0.99 \times T_{NIR}$. Even more preferably, the optical material has a $T_{VIS}$ higher than or equal to $T_{NIR}$. This can be achieved by selecting an appropriate near infrared absorber and/or by controlling the amount of near infrared absorber that is used, as higher amounts of NIR absorbers may increase this ratio.

The near infrared absorber can be organic or inorganic, preferably organic. An advantage of organic near infrared absorbers is that they can be solubilized in substrate monomers, and do not generate diffusion or haze.

In one embodiment, the optical material does not contain any inorganic near infrared absorber. In another embodiment, the optical material contains less than 5% by weight of inorganic near infrared absorbers relative to the total amount of near infrared absorbers present in the material.

Near infrared absorbers having the required absorption properties can be chosen from various chemical families, for example from phthalocyanines, naphthalocyanines, azo compounds, polymethines, porphyrines, triphenylmethanes, iminiums, squaric acid compounds such as squaryliums, croconiums, dithiolenes such as nickel dithiolenes, quinones such as anthraquinones, perylenes such as polyperylenes, pyriliums, thiopyriliums, and cyanines. The near infrared absorber is preferably a polymethine, phthalocyanine, porphyrine, triphenylmethane, iminium, squarylium, croconium, dithiolene, quinone, polyperylene, pyrilium, thiopyrilium, or cyanine near infrared absorber.

Near infrared absorbers generally contain sterically hindered side groups, such as, for example, phenyl, phenoxy, alkylphenyl, alkylphenoxy, tert-butyl, —S-phenyl, —NH-aryl, —NH-alkyl and similar groups.

Suitable examples of additional near infrared absorbers are described for example, in Matsuoka, M. Infrared Absorbing Dyes, Plenum Press, New York, 1990 and Fabian, J., Nakazumi, H., Matsuoka, M. Near Infrared Absorbing Dyes, Chem. Rev. 1992, 92, 1197-1226.

The best NIR absorbers are those having a broad-band absorption in the near infrared range, that are compatible with the matrix, i.e., stable in the presence of the monomers that are used, and thermally resistant. In one embodiment, the near infrared absorber presents an absorption peak occurring at higher wavelengths than the visible range (>780 nm), with no "tail" in the visible range. In another embodiment, the near infrared absorber has minimum absorption peaks in the visible range.

Specific examples of suitable near infrared absorbers are NIR-920A® and NIR-1031A®, both available from QCR Solutions Corp.

These NIR dyes can be used singly or in combinations to create custom spectral filters. Hence, mixtures of near infrared absorbers can be employed in order to optimize the absorption decrease in the near-infrared range by means of a suitable selection. The NIR absorbers can be so combined that a maximum absorption range is covered in the near infrared region by the individual NIR absorbers.

The amount of NIR absorbing compounds used in the present invention is an amount sufficient to provide a satisfactory protection from near infrared light but not excessive so as to prevent precipitation.

The inventive near infrared absorber is generally present in the optical material in an amount that is preferably lower than 100 ppm, more preferably lower than 75 ppm, even more preferably lower than 50 ppm, relative to the weight of the optical material (or per 100 parts by weight of the polymerizable compounds or relative to the weight of the optical material composition), said amount preferably ranging from 5 to 25 ppm, more preferably from 5 to 20 ppm.

Thus, very small amounts of the NIR absorbers can be added to the matrix to achieve the desired protection. This is an advantage since there are no mechanical or thermomechanical changes in the properties of the substrates caused by these low concentrations.

The NIR absorbers that may be used in the present invention have the ability to at least partially block light having a wavelength ranging from 780 to 1400 nm. The resulting optical material thus provides a high level of retinal cell protection.

They are further characterized by their color neutrality in the visible range due to their low absorption in the visible range of light and hence do not lead to markedly increased haze or markedly reduced transmission in the visible range of light of the end product.

Obtaining low residual color intensity (chroma) lenses is important in wearer's comfort viewpoint, as color distortions are minimum and cosmetic acceptance is higher. When the lens is color balanced, the resulting transmission is higher due to the use of the present NIR absorbers, as less transmission loss occurs because of grey generation trough complementary color neutralization.

The optical material according to the invention preferably blocks or cuts more than 10% of the light having a wavelength ranging from 780 to 1400 nm, more preferably more than 15%, 20%, 25% or 30%. In the present application, "blocking X %" of incident light in a specified wavelength range does not necessarily mean that some wavelengths within the range are totally blocked, although this is possible. Rather, "blocking X %" of incident light in a specified wavelength range means that an average of X % of said light within the range is not transmitted.

In addition, light blocking is considered here for an optical material devoid of any coating, especially antireflective coating. It means that light reflected by the optical material is not transmitted and considered as blocked.

In the present description, unless otherwise specified, averages are arithmetic averages and optical transmittances/transmissions are measured at the center of the optical article and given for a 2 mm thick layer of the optical material, at a normal incidence of the light beam (0° from the normal). Accordingly, as used herein, optical transmittance within a wavelength range is an average of light transmitted within this range and is not weighted according to the sensitivity of the eye at each wavelength of the range. Chromas and optical transmittances transmissions are expressed for optical substrates having no coatings, in particular no antireflective coatings. In particular, reflection at both air/substrate interfaces reduces significantly optical transmittance, around 4-5% for each interface, i.e. 8-10% for a lens.

The average optical transmittance through a 2 mm thick layer of the optical material for light having a wavelength ranging from 380 nm to 780 nm ($T_{VIS}$) is preferably higher than or equal to 75%, more preferably higher than or equal to 76%, 77%, 78%, 79% or 80%.

The optical material according to the invention preferably has a relative light transmission factor in the visible spectrum Tv higher than or equal to 75%, preferably higher than or equal to 76%, more preferably higher than or equal to 78%, and better higher than or equal to 80%.

Optical articles made from optical material according to the invention can be coated with antireflective coatings on one or both air/substrate interface(s). In such embodiments, the Tv factor preferably ranges from 85% to 99%, more preferably from 88% to 98%, even better from 88% to 97%.

The Tv factor, also called "luminous transmission" of the system, is such as defined in the standard NF EN 1836 and relates to an average in the 380-780 nm wavelength range that is weighted according to the sensitivity of the eye at each wavelength of the range and measured under D65 illumination conditions (daylight).

The substrate made of the present optical material preferably has a chroma C* (chromaticity) as defined in the international colorimetric system CIE L*a*b* lower than or equal to 4.5, preferably lower than or equal to 4, for a 2 mm thick layer of said optical material. C* expresses the residual color intensity and is defined in the present description for the illuminant D65 and standard observer angle (10°), in transmission.

The substrate of the invention is therefore particularly suitable for non solar ophthalmic lenses.

The optical material composition can contain additives commonly used in the art other than those mentioned above, for example internal mold release agents (described e.g. in US 2014/252282), resin modifiers, light stabilizers, UV absorbers, polymerization catalysts, color balancing agents, chain extenders, crosslinking agents, free radical scavengers such as antioxidants and hindered amine light stabilizers, dyes, pigments, fillers, and adhesion accelerators.

The optical material composition according to the invention generally comprises a system for initiating the polymerization (catalyst). The polymerization initiating system can comprise one or more thermal or photochemical polymerization initiating agents or alternatively, a mixture of thermal and photochemical polymerization initiating agents, depending on the nature of the polymerizable compounds. Generally, the initiating agents are used in a proportion of 0.01 to 5% by weight with respect to the total weight of polymerizable compounds present in the composition.

In particular, for substrates resulting from polymerization or (co)polymerization of polyurethane and polythiourethane resins, preferred catalysts are selected from alkyltins, alkyltin oxides, metal coordination complexes or amines, more preferably alkyltins. A preferred proportion for alkyltins is 0.02 to 2% by weight with respect to the total weight of polymerizable compounds present in the composition. Preferred alkyltins are dibutyltin dichloride and dimethyltin dichloride.

According to the invention, the optical material can comprise at least one absorbing dye that at least partially inhibits transmission of light in the 400 nm to 500 nm wavelength range, i.e., the blue wavelength range, more preferably the 415-455 nm range or the 420-450 nm range, in order to combine near infrared and blue light cutting features.

It is recommended to limit the exposure to blue light potentially harmful, in particular the wavelength band with an increased dangerousness (415-455 nm). In the present disclosure, said dye will be referred to as a blue light blocking dye. It is typically a yellow dye.

The chemical nature of this dye is not particularly limited, provided that it has an absorption peak, ideally a maximum absorption peak, within the 400-500 nm range. The dyes and absorbers are selected and processed in a way such that they are compatible with the monomers according to the invention, and well and stably distributed or dispersed in the matrix of the coating, providing low haze coatings.

The dye preferably at least partially inhibits transmission of light within the 415-455 nm wavelength range by absorption, more preferably within the 420-450 nm range, in order to provide a high level of retinal cell protection against retinal cell apoptosis or age-related macular degeneration.

It may be particularly desirable in some cases to selectively filter a relatively small portion of the blue spectrum, i.e., the 420 nm-450 nm region. Indeed, blocking too much of the blue spectrum can interfere with scotopic vision and mechanisms for regulating biorhythms, referred to as "circadian cycles". Thus, in a preferred embodiment, the dye blocks less than 5% of light having a wavelength ranging from 465 to 495 nm, preferably from 450 to 550 nm. In this embodiment, the dye selectively inhibits the phototoxic blue light and transmits the blue light implicated in circadian rhythms. Preferably, the optical article transmits at least 95% of light having a wavelength ranging from 465 to 495 nm. This transmittance is an average of light transmitted within the 465-495 nm range that is not weighted according to the sensitivity of the eye at each wavelength of the range. In another embodiment, the dye does not absorb light in the 465-495 nm range, preferably the 450-550 nm range.

The dye does preferably not absorb, or very little, in regions of the visible spectrum outside the 400-500 nm wavelength range, to minimize the appearance of a plurality of colors. In this case, the dye selectively inhibits transmission of light within this wavelength range. As used herein, a dye "selectively inhibits" a wavelength range if it inhibits at least some transmission within the specified range, while having little or no effect on transmission of wavelengths outside the selected wavelength range, unless specifically configured to do so.

In certain embodiments, the dye comprises one or more porphyrins, porphyrin complexes, other heterocycles related to porphyrins, including corrins, chlorins and corphins, derivatives thereof, or the perylene, coumarin, acridine, indolenin (also known as 3H-indole), anthraquinone, azobenzene, phthalocyanine, cyanines, quinoline, benzotriazole, nitrobenzene, isoquinoline, isoindoline, diarylmethane and indol-2-ylidene families. Derivatives are substances generally issued by an addition or substitution. The preferred dyes are diarylmethane dyes such as auramine O and porphyrin dyes.

The dye may include one or more dyes from the group consisting of: coumarin 343; coumarin 314; nitrobenzoxadiazole; lucifer yellow CH; 9,10-bis(phenylethynyl)anthracene; proflavin; 4-(dicyanomethylene)-2-methyl-6-(4-dimethyl aminostyryl)-4H-pyran; 2-[4-(dimethylamino)styryl]-1-methypyridinium iodide, lutein, zeaxanthin, and yellow dyes having a narrow absorption peak available from Exciton Inc. such as ABS-419®, ABS-420® or ABS-430®.

The amount of dye used in the present invention is an amount sufficient to provide a satisfactory inhibition of light within the 380-780 nm wavelength range. For example the dye can be used at a level of 0.005 to 0.50% or 0.01 to 0.2% based on the weight of the optical material, depending on the strength of the dye and the amount of inhibition/protection desired. It should be understood that the invention is not limited to these ranges, which are only given by way of example.

In one embodiment of the invention, the optical material further comprises at least one UV absorber in order to reduce or prevent UV light from reaching the retina (in particular in ophthalmic lens materials), but also to protect the substrate material itself, thus preventing it from weathering and becoming brittle and/or yellow. Said UV absorber also limits or even eliminates photo-degradation of dyes and absorbers contained in the substrate. It can also be incorporated into a coating present at the surface of the optical article.

The UV spectrum has many bands, especially UVA, UVB and UVC bands. Amongst those UV bands reaching the earth surface, UVA band, ranging from 315 nm to 380 nm, and UVB band, ranging from 280 nm to 315 nm, are particularly harmful to the retina.

The UV absorber that may be used in the present invention preferably has the ability to at least partially block light having a wavelength shorter than 400 nm, preferably UV wavelengths below 385 or 390 nm.

Most preferred ultraviolet absorbers have a maximum absorption peak in a range from 350 nm to 370 nm and/or do not absorb light in the 465-495 nm range, preferably the 450-550 nm range. In one embodiment, the UV absorber does not absorb any substantial amount of visible light.

In a preferred embodiment, the UV absorber has the ability to at least partially cut blue light, and thus presents an absorption spectrum extending to a selected wavelength range within the visible blue light range of the electromagnetic spectrum (400-500 nm region), in particular the wavelength band with an increased dangerousness, i.e., the 415-455 nm range, preferably the 420-450 nm range.

Suitable UV absorbers include without limitation substituted benzophenones such as 2-hydroxybenzophenone, substituted 2-hydroxybenzophenones disclosed in U.S. Pat. No. 4,304,895, 2-hydroxy-4-octyloxybenzophenone (Seesorb 102®) 2,7-bis(5-methylbenzoxazol-2-yl)-9,9-dipropyl-3-hydroxyfluorene, 1,4-bis(9,9-dipropyl-9H-fluoreno [3,2-d] oxazol-2-yl)-2-hydroxyphenyl, 2-hydroxyphenyl-s-triazines and benzotriazoles compounds.

The UV absorber is preferably a benzotriazole compound. Suitable UV absorbers from this family include without limitation 2-(2-hydroxyphenyl)-benzotriazoles such as 2-(2-hydroxy-3-t-butyl-5-methylphenyl) chlorobenzotriazole, n-octyl-3-[3-tert-butyl-4-hydroxy-5-(5-chloro-2H-benzotriazol-2-yl)phenyl] propionate (Eversorb 109®), 2-(2'-hydroxy-5'-t-octylphenyl) benzotriazole, 2-(3'-methallyl-2'-hydroxy-5'-methyl phenyl) benzotriazole or other allyl hydroxymethylphenyl benzotriazoles, 2-(2-hydroxy-5-methylphenyl)-2H-benzotriazole (Seesorb® 701), 2-(3,5-di-t-amyl-2-hydroxyphenyl) benzotriazole, and the 2-hydroxy-5-acryloxyphenyl-2H-benzotriazoles disclosed in U.S. Pat. No. 4,528,311. Preferred absorbers are of the benzotriazole family. Commercially available products include Tinuvin® and Chimassorb® compounds from BASF such as Tinuvin® 326, Seeseorb® 701 and 703 from Shipro Kasei Kaisha, Viosorb 550® from Kyodo Chemicals, and Kemisorb 73® from Chemipro and TCP Tinuvin Carbo Protect from BASF.

The UV absorber is preferably used in an amount representing from 0.1 to 5% of the weight of the optical material, and preferably from 0.2 to 2%.

The NIR absorbers according to the invention produce no residual color, or very low residual color. However, blue light blocking means such as dyes or specific UV absorbers that can be present in the polymerizable composition tend to produce a color tint in the optical article as a "side effect", the latter appearing yellow, brown or amber. Indeed, partially inhibiting visible light may affect color balance, color vision through the lens, and the color in which the lens is perceived. This is esthetically unacceptable for many optical applications, and may interfere with the normal color perception of the user if the device is an ophthalmic lens.

In order to compensate for the yellowing effect of the blue light blocking means and obtaining an optical article having a cosmetically acceptable appearance for the wearer and when viewed by an external observer, in particular perceived as mostly color neutral, the optical article comprises, in one embodiment, at least one color-balancing component, in order to obtain a colorless appearance.

The color balancing components, dyes and UV absorbers can be incorporated into the substrate of the optical article using the same methods are those previously described for the incorporation of the NIR absorbing compounds, or in at least one coating/film applied on the surface of the substrate, such as a primer coating or hard coat. They are preferably incorporated into the optical material itself, i.e., in the optical material composition used to prepare the optical material, preferably by casting or injection molding.

In the present invention, the color balancing agent is preferably a bluing agent, i.e., a compound having an absorption band in the visible light spectrum in the orange to yellow wavelength region and manifesting a color from blue to violet.

In one embodiment, the color-balancing component employed to at least partially offset the yellowing effect is a dye or a pigment, such as a blue tinting dye, or a mixture of dyes used in suitable proportions, such as a combination of red and green tinting dyes.

Examples of suitable fixed-tint colorants can include any of the art recognized inorganic and organic pigments and/or dyes. Inorganic dyes and pigments can be selected from ultramarine blue, iron blue (Prussian blue—potassium ferric ferrocyanide), and cobalt blue. Organic dyes and pigments can be selected from azo dyes (monoazo and diazo compounds), polymethyne dyes, arylmethyne dyes, polyene dyes, anthracenedione dyes, pyrazolone dyes, quinophtalone dyes and carbonyl dyes. Specific examples of such organic dyes include Blue 6G, Violet PF and Magenta RB available from Keystone Aniline, Morplas Blue from Morton International, Inc., D&C Violet #2 available from Sensient Corp., Macrolex Violet 3R from Bayer, Diaresin Blue J supplied by Mitsubishi Chemical Corporation, and Rubine Red from Clariant Corporation. Also suitable are laser dyes, for example those selected from pyrromethene, fluoroscein, rhodamine, malachit green, azine compounds such as oxazine or carbazine, triallylmethane compounds, condensed polycyclic compounds (e.g. indigo compounds and anthraquinone compounds), pyridines, carbocyanine iodide, phthalocyanine compounds and others. Specific examples include ABS 574, ABS 668 or ABS 674 from Exiton, Inc.; or SDA2443, SDA3572 or ADA4863 available from H.W. Sands Corp. Mixtures of any of the aforementioned dyes can be used.

In another embodiment, the color balancing component is an optical brightener, also called fluorescent whitening agent (FWA), optical brightening agent (OBA) or fluorescent brightening agent (FBA). As well known, optical brighteners are substances that absorb light in the UV and violet region (usually at 340-370 nm) and emit light by fluorescence mainly in the blue region of the visible spectrum (400-500 nm) in order to mask the yellow color imparted by the absorbers. Preferred optical brighteners have high fluorescence efficiency, i.e., re-emit as visible light a major proportion of the energy they have absorbed.

The optical brightener may be chosen, without limitation to these families, from stilbenes, carbostyrils, coumarins, 1,3-diphenyl-2-pyrazolines, naphthalimides, combined heteroaromatics (such as pyrenyl-triazines or other combinations of heterocyclic compounds such as thiazoles, pyrazoles, oxadiazoles, fused polyaromatic systems or triazines, directly connected to each other or through a conjugated ring system) benzoxazoles, in particular benzoxazoles substituted at the 2-position with a conjugated ring system, preferably comprising ethylene, phenylethylene, stilbene, benzoxazole and/or thiophene groups. Preferred families of optical brighteners are bis-benzoxazoles, phenylcoumarins, methylcoumarins and bis-(styryl)biphenyls, which are described in more details in A. G. Oertli, Plastics Additives Handbook, 6th Edition, H. Zweifel, D. Maier, M. Schiller Editors, 2009, and Fluorescent Whitening agents, Anders G. EQS, Environmental quality and safety (Suppl. Vol IV) Georg Thieme Stuttgart 1975. The most preferred optical brighteners are 2,2'-(1,2-ethylenediyldi-4,1-phenylene) bis-benzoxazole, marketed by Eastman Chemical under the trade name Eastobrite® OB-1 and 2,5-thiophenediylbis(5-tert-butyl-1,3-benzoxazole), marketed by BASF under the tradename Tinopal® OB.

More details concerning this embodiment, such as the arrangement of the color-balancing component relative to a system blocking blue light wavelengths, and further exemplary systems including a blue light blocking component and a color-balancing component can be found e.g. in U.S. Pat. No. 8,360,574, WO 2007/146933, and WO 2015/097186 and WO 2015/097492 both in the name of the applicant.

The color balancing component is generally used in an amount sufficient to adjust the hue of the optical material, typically from 0.01 to 5% by weight, more preferably from 0.1 to 2%, relative to the weight of the optical material composition (or per 100 parts by weight of the polymerizable compounds or relative to the material total weight). This amount depends on the nature (strength) and the amount of the absorbers that are used, and on the final color and transmission desired. Those of skill in the art should appreciate that the respective amounts of color-balancing component and visible light blocking means have to be adapted to each other to produce a transparent, colorless material. To this end, the optimal amounts of each compound can be determined by simple laboratory experiments.

The invention also relates to a method for preparing an optical article such as herein described, comprising:

obtaining a polymerizable composition comprising at least one polymerizable compound and at least one near infrared absorber, curing said polymerizable composition so as to form an optical article substrate made of an optical material comprising a polymer matrix and said at least one near infrared absorber, wherein $T_{VIS}$ is higher than or equal to 70% and $T_{NIR}$ is lower than or equal to 85%.

In some aspects of the invention, said at least one polymerizable compound is selected from allyl glycol carbonates, polythiols, episulfides, polyisocyanates, polyisothiocyanates and (meth)acrylates.

In one embodiment of the invention, the polymerizable composition is prepared by first mixing the NIR absorber and optional absorbers such as a UV absorber with at least one first monomer to obtain a homogeneous first composition, and then at least one second monomer is optionally added in said composition to obtain a second composition.

Additives such as catalysts, color balancing agents and mold release agents can be added to the first and/or second composition.

The process according to the invention in advantageous since it requires no specific steps such as tinting and no specific coating comprising NIR absorbers.

The invention further relates to a plastic eyeglasses lens comprising a lens substrate, the lens substrate being obtained from the above disclosed optical material, preferably by molding.

The following examples illustrate the present invention in a more detailed, but non-limiting manner. Unless stated otherwise, all thicknesses disclosed in the present application relate to physical thicknesses.

EXAMPLES

1. Chemicals Used

Optical materials were prepared from a composition comprising polymerizable monomers, at least one near infrared absorber, dimethyltin dichloride as a catalyst (CAS No. 753-73-1), Eversorb 109® as a UV absorber offering protection against blue light (CAS No. 83044-89-7), Diaresin blue J® as a bluing agent (CAS No. 86090-40-6) and Zelec UN® as a mold release agent.

The monomers used in the present examples were norbonane diisocyanate (ISO, CAS No. 74091-64-8), the pentaerythritol tetrakis (3-mercaptopropionate) (THIOL1, CAS No. 7575-23-7), and 2,3-bis((2-mercaptoethyl)thio)-1-propanethiol (THIOL2, CAS No. 131538-00-6), in order to produce the MR8® polythiourethane matrix.

The near infrared absorbers according to the invention used in the examples were NIR-920A® (Cyanine dye from QCR Solutions Corp) and NIR-1031A® (from QCR Solutions Corp). Lumogen IR 765® (Quaterrylene dye from BASF) was used as a comparative near infrared absorber. In the MR8® resin, NIR-920A®, NIR-1031A® and Lumogen IR 765® respectively have a maximum absorption wavelength in the near infrared area at 951 nm, 1065 nm and 790 nm.

2. Manufacture of Near Infrared Cutting Lenses by Casting

Convex and concave molds were assembled by using typing process. A center thickness adjustment was made to obtain 2 mm thick samples.

The formulations of examples 1-6 and comparative examples C1-C3 were prepared in small batch size by using a 100 mL thick wall bottle fitted with a magnetic stirrer, a glass tube for nitrogen intake and a vacuum connection. The near infrared and UV absorbers were mixed with the ISO monomer (isocyanate part) at room temperature (25° C.) until a homogeneous mixture was obtained or, if at least one of the absorbers was not dissolved at room temperature (25° C.), under moderate heat (30° C.). The lens of comparative example 3 comprised a blank polymer matrix, i.e., that did not contain any near infrared absorber.

The dimethyl tin dichloride catalyst was added in the reaction mixture, which was then cooled down to 10° C. prior to addition of the thiol monomers THIOL1 and THIOL2, and stirred under vacuum until homogeneous. The bluing agent and mold release agent were added at the end of the preparation.

The assembled molds were filled with the final formulations using a cleaned syringe, and the polymerization reaction was carried out in a regulated electronic oven at maximum 130° C. for 1 day. The molds were then disassembled to obtain lenses comprising a body of a thermoset material. The lenses were cleaned by immersion and sonication in a surfactant solution, then rinsed and dried.

3. Formulations Prepared and Characterizations

The formulations prepared and the spectral characterizations of the resulting lenses are shown in table 1 hereunder and on FIG. 1, plotting the chroma as a function of the average transmission in the near infrared region.

Transmissions in the visible and near infrared spectrum were measured in transmission mode from a wearer's view angle using a Cary 4000 spectrophotometer from Hunter, with the back (concave) side of the lens (2 mm thickness at the center) facing the detector and light incoming on the front side of the lens, under D65 illumination conditions (daylight).

$T_{NIR}$ (%) is the average transmission in the near infrared area (780-1400 nm). $T_{VIS}$ is the average transmission in the visible area (380-780 nm). These are non weighted arithmetic averages.

TABLE 1

| Compound (parts by weight unless otherwise specified) | Examples | | | | | | | | |
|---|---|---|---|---|---|---|---|---|---|
| | 1 | 2 | 3 | 4 | 5 | 6 | C1 | C2 | C3 |
| NIR-920A ® (NIR absorber, ppm) | 5 | 10 | 20 | | | | | | |
| NIR-1031A ® (NIR absorber, ppm) | | | | 5 | 10 | 20 | | | |
| IR 765 ® (NIR absorber, ppm) | | | | | | | 25 | 100 | |
| UV absorber | 0.3 | 0.3 | 0.3 | 0.3 | 0.3 | 0.3 | 0.3 | 0.3 | 0.3 |
| ISO monomer | 50.60 | 50.60 | 50.60 | 50.60 | 50.60 | 50.60 | 50.60 | 50.60 | 50.60 |
| THIOL1 monomer | 23.90 | 23.90 | 23.90 | 23.90 | 23.90 | 23.90 | 23.90 | 23.90 | 23.90 |
| THIOL2 monomer | 25.29 | 25.29 | 25.29 | 25.29 | 25.29 | 25.29 | 25.29 | 25.29 | 25.29 |
| Catalyst | 0.04 | 0.04 | 0.04 | 0.04 | 0.04 | 0.04 | 0.04 | 0.04 | 0.04 |
| Bluing agent | 0.21 | 0.21 | 0.21 | 0.21 | 0.21 | 0.21 | 0.21 | 0.21 | 0.21 |
| Mold release agent | 0.07 | 0.07 | 0.07 | 0.07 | 0.07 | 0.07 | 0.07 | 0.07 | 0.07 |
| $T_{VIS}$ (%) | 80.01 | 78.25 | 75.92 | 80.27 | 77.83 | 74.69 | 76.06 | 57.64 | 82.52 |
| $T_{NIR}$ (%) | 80.79 | 75.78 | 69.73 | 81.35 | 78.18 | 69.97 | 83.62 | 74.18 | 87.39 |
| C* | 2.89 | 3.09 | 3.17 | 3.22 | 3.42 | 4.39 | 3.31 | 8.56 | 2.83 |

As can be seen, all the lenses prepared offered protection from near infrared light. The three near infrared absorbers investigated decreased the average transmission in the near infrared area from 87.39% (comparative example 3) to 70-80% (examples 1-6). Table 1 and FIG. 1 show that the near infrared absorbers having the lowest absorption in the visible range provide lenses with the lowest residual color intensity (C*) at iso-$T_{NIR}$ (%). C* is the chroma of the optical material containing said at least one near infrared absorber for a 2 mm thick layer of said optical material.

The near infrared absorbers according to the invention have a very limited impact on the substrate's color. The present invention provides optical article materials that show almost no residual color intensity increase while near infrared transmission decreases: the slope value is almost zero for NIR-920A® and NIR-1031A® on FIG. 1.

Conversely, near infrared dyes having significant absorption in the visible range such as Lumogen IR 765® show a strong increase of C* over near infrared transmission decrease (comparative examples C1, C2), making them unsuitable to provide low color intensity lenses at relevant near infrared absorbing concentrations. In other words, the comparative near infrared absorber Lumogen IR 765® excessively increases C* of the optical material when used at amounts necessary to obtain a satisfactory decrease of the transmission in the near infrared area.

The invention claimed is:

1. An optical article having a substrate made of an optical material comprising a polymer matrix and at least one near infrared absorber, wherein the optical material has the following properties:
   $T_{VIS}$ is higher than or equal to 77%; and
   $T_{NIR}$ is lower than or equal to 80%, in which:
   $T_{VIS}$ is the average optical transmittance in the 380-780 nm wavelength range for the optical material containing said at least one near infrared absorber through a 2 mm thick layer of said optical material; and
   $T_{NIR}$ is the average optical transmittance in the 780-1400 nm wavelength range for the optical material containing said at least one near infrared absorber through a 2 mm thick layer of said optical material.

2. The optical article of claim 1, wherein $T_{VIS}$ is higher than or equal to $0.95 \times T_{NIR}$.

3. The optical article of claim 2, wherein $T_{VIS}$ is higher than or equal to $T_{NIR}$.

4. The optical article of claim 1, wherein the polymer matrix comprises at least one of a polyurethane, polythiourethane, polyepisulfide, polymer obtained from a polyol allyl carbonate, polycarbonate, or poly(meth)acrylate.

5. The optical article of claim 4, wherein the polymer matrix comprises at least one polythiourethane.

6. The optical article of claim 1, wherein said at least one near infrared absorber is a polymethine, phthalocyanine, porphyrine, triphenylmethane, iminium, squarylium, croconium, dithiolene, quinone, polyperylene, pyrilium, thiopyrilium or cyanine near infrared absorber.

7. The optical article of claim 1, wherein said at least one near infrared absorber is present in the optical material in an amount lower than 100 ppm, relative to the weight of said optical material.

8. The optical article of claim 7, wherein said at least one near infrared absorber is present in the optical material in an amount ranging from 5 to 25 ppm, relative to the weight of said optical material.

9. The optical article of claim 7, wherein said at least one near infrared absorber is present in the optical material in an amount ranging from 5 to 20 ppm, relative to the weight of said optical material.

10. The optical article of claim 1, wherein the optical material further comprises at least one UV absorber.

11. The optical article of claim 1, further defined as an ophthalmic lens.

12. The optical article of claim 1, wherein said substrate has a chroma C* as defined in the international colorimetric system CIE L*a*b* with the illuminant D65 lower than or equal to 4.5, for a 2 mm thick layer of said optical material.

13. The optical article of claim 12, wherein said substrate has a chroma C* as defined in the international colorimetric system CIE L*a*b* with the illuminant D65 lower than or equal to 4, for a 2 mm thick layer of said optical material.

14. The optical article of claim 1, wherein the polymer matrix consists of a polythiourethane polymer.

15. A method for preparing the optical article of claim 1, comprising:
   obtaining a polymerizable composition comprising at least one polymerizable compound and at least one near infrared absorber; and
   curing said polymerizable composition so as to form an optical article substrate made of an optical material comprising a polymer matrix and said at least one near infrared absorber,
   wherein $T_{VIS}$ is higher than or equal to 77%, $T_{NIR}$ is lower than or equal to 80%, $T_{NIR}$ and $T_{VIS}$ being such as defined in claim 1.

16. The method of claim 15, wherein said at least one polymerizable compound is selected from allyl glycol carbonates, polythiols, episulfides, polyisocyanates, polyisothiocyanates and (meth)acrylates.

* * * * *